United States Patent
Peled et al.

(10) Patent No.: US 7,636,947 B2
(45) Date of Patent: Dec. 22, 2009

(54) APPARATUS AND METHOD FOR ELECTRONIC MAIL FILTERING

(75) Inventors: Ariel Peled, Even-Yuhuda (IL); Lidror Troyansky, Givataim (IL); Guy Lupo, Givataim (IL); Ofir Carny, Kochav-Yair (IL)

(73) Assignee: PortAuthority Technologies Inc., San Diego, CA (US)

( * ) Notice: Subject to any disclaimer, the term of this patent is extended or adjusted under 35 U.S.C. 154(b) by 740 days.

(21) Appl. No.: 10/859,156

(22) Filed: Jun. 3, 2004

(65) Prior Publication Data

US 2004/0260924 A1  Dec. 23, 2004

Related U.S. Application Data

(60) Provisional application No. 60/475,491, filed on Jun. 4, 2003.

(51) Int. Cl.
G06F 17/30 (2006.01)
(52) U.S. Cl. .................... 726/30; 726/3; 726/4
(58) Field of Classification Search ............... 726/30, 726/3, 4
See application file for complete search history.

(56) References Cited

OTHER PUBLICATIONS

Ask the Windows 2000 Dev Team Published: Oct. 6, 1999, Microsoft Technet.*
W3control, W3filter, year 2002.*
Intelligent techniques for network sensor information processing in large-scale network infrastructures; Hooper, E.; Intelligent Sensors, Sensor Networks and Information Processing, 2008. ISSNIP 2008. International Conference on Dec. 15-18, 2008 pp. 593-598.*
Federated security management for dynamic coalitions; Bhatt, S.; Raj Rajagopalan, S.; Rao, P.; DARPA Information Survivability Conference and Exposition, 2003. Proceedings vol. 2, Apr. 22-24, 2003 pp. 47-48 vol. 2.*
Secure Web-based monitoring and control system; Furuya, M.; Kato, H.; Sekozawa, T.; Industrial Electronics Society, 2000. IECON 2000. 26th Annual Confjerence of the IEEE vol. 4, Oct. 22-28, 2000 pp. 2443-2448.*

* cited by examiner

Primary Examiner—David Y Jung (57) ABSTRACT

A method for distributed management of phrase-based security policy, the security policy applied with respect to a digital medium, the method comprising: storing at least one phrase together with accompanying security policy; assigning an owner to at least one of the stored phrases; scanning and analyzing the digital medium in order to locate and identify the at least one stored phrase; upon locating the at least one phrase within a digital item in the digital medium: applying the security policy with respect to the digital item, and notifying the owner.

32 Claims, 7 Drawing Sheets

| Key Word | Owner | Authorized Senders | Authorized Recipient | Authorized Releaser | Actions |
|---|---|---|---|---|---|
| NDA | Legal | Legal group | Tom, Dick & Harry | John Paul | • Quarantine<br>• Notify John Paul<br>• Log<br>• |

APPARATUS AND METHOD FOR ELECTRONIC MAIL FILTERING

CROSS-REFERENCE TO RELATED APPLICATIONS

This application is related to and claims priority from U.S. Provisional Patent Application No. 60/475,491, filed Jun. 4, 2003, the contents of which are hereby incorporated herein by reference in their entirety.

FIELD OF THE INVENTION

The present invention relates to monitoring and enforcing a distribution policy with respect to digital items, more particularly but not exclusively to methods involving distributed management of keyword and key-phrase based filtering.

BACKGROUND OF THE INVENTION

Modern businesses and industries rely heavily on the creation, storage and transportation of digital documents and other kinds of digital files as a primary means of communication, information storage, and documentation. In many cases, the digital documents and files contain proprietary and/or confidential material. In other cases, digital items may contain sensitive, offensive or provocative material. It is therefore imperative to allow for effective traffic filtering of the digital information.

One of the most prevalent means for digital content filtering and screening is keywords or key-phrase based filtering: the traffic of digital items is scanned in order to find whether pre-defined key-words, key-phrase, numbers etc. exist in the scanned item. In cases in which the item contains one or more of the previously stored keyword or key-phrase, a pre-defined policy is applied with respect to the distribution of the item (e.g., block the transmission of the item). One of the main problems with this method is the management overhead: keywords may be supplied by various entities and departments within the organization (e.g., legal, financial, human-resources, top-tier management etc.). If the inspected item contains one or more words or phrases from the list, the distribution of the item is, in many cases, blocked, and the administrator then needs to check the details of the event. Since keyword filtering may result in a high-rate of false alarms, this causes a significant management overhead on the administrator, which may cause the whole method to be rendered impractical.

Prior art solutions use cumbersome manual solutions to overcome the problem—e.g., negotiation with the originator of the keyword about a possible removal of the keyword or a policy relaxation.

There is thus a recognized need for, and it would be highly advantageous to have, a method and system that allows an efficient management of keywords filtering, which overcomes the drawbacks of current methods as described above.

SUMMARY OF THE INVENTION

The present invention seeks to provide a novel method and system for managing keywords-based content filtering. Specifically, the current invention provides methods that allow for a distributed management of keywords and key-phrases.

It is the object of the present invention to reduce the management overhead of keyword and keyphrase-based filtering of electronic traffic and storage.

According to a first aspect of the present method for distributed management of phrase-based security policy, the security policy being applied with respect to a digital medium, the method comprising: Storing at least one phrase together with an accompanying security policy.

Assigning an owner to the at least one stored phrase.

Scanning and analyzing the digital medium in order to locate and identify the at least one stored phrase.

Upon detection of the at least one stored phrase within a digital item in the digital medium:
  i. Applying the security policy with respect to the digital item, and:
  ii. Notifying the owner.

Note that in many cases, the owner is the one who first suggested the keyword or keyphrase and its accompanying policy, and has therefore a better insight regarding the implications of their existence in a certain context, and therefore can provide better instructions after their detection.

In another preferred embodiment of the present invention, the method further comprising receiving at least one instruction from the owner, and applying an instruction of the owner with respect to the digital item.

In another preferred embodiment of the present invention, the phrase comprises any of: keyword, keyphrase and number.

In another preferred embodiment of the present invention, the security policy comprises either of a distribution policy and a usage policy.

In another preferred embodiment of the present invention, the security policy comprises determining a legitimacy of at least one of the following:
  A set of authorized recipients.
  A set of authorized usages.
  A set of allowed formats.
  A set of allowed distribution channels, and
  A required action.

In another preferred embodiment of the present invention, the method further comprising approving at least one phrase or its the accompanying security policy before the storing at least one phrase.

In another preferred embodiment of the present invention, the security policy comprises rules to be applied after detecting at least one set of the stored phrases within the digital item. In another preferred embodiment of the present invention, the above set comprises one or more combinations of the stored phrases.

In another preferred embodiment of the present invention, the security policy comprises at least one rule, the at least one rule being to determine the actions to be applied according to the number of the phrases detected within the digital item.

In another preferred embodiment of the present invention the method further comprising assigning a default security policy to the at least one stored phrase.

In another preferred embodiment of the present invention, the assigning of the default security policy comprises:
  Allowing the owner to assign an impact parameter to the stored phrase, the impact parameter reflecting the expected negative impact of an unauthorized dissemination of a message containing the stored phrase.
  Defining at least one rule, the at least one rule defines at least one action to be taken upon detecting at least one phrase to which the impact parameter was assigned, and the at least one action is determined according to the impact parameter.

In another preferred embodiment of the present invention, assigning the default security policy comprises:

Allowing the owner to assign a secrecy level to the stored phrase.

Defining at least one rule, the at least one rule defines at least one action to be taken upon detecting at least one phrase to which the secrecy level was assigned, and the at least one action is determined according to the secrecy level.

In another preferred embodiment of the present invention, assigning the default security policy comprises:

Allowing the owner to define a project to which the stored phrases are related.

Defining at least one rule, the rules defines at least one action to be taken upon detecting at least one phrase to which the project was assigned, and the at least one action is determined according to the project.

In another preferred embodiment of the present invention, the owner comprises a group of users.

In another preferred embodiment of the present invention, approving at least one phrase comprises: determining the expected increase in false-alarm rate due to adding the at least one phrase or its the accompanying security policy, and deciding whether to approve the at least one phrase based on the expected increase in the false-alarm rate.

In another preferred embodiment of the present invention, determining the expected increase in false-alarm rate comprises comparing the distribution of the at least phrase in classified documents and in unclassified documents.

In another preferred embodiment of the present invention, determining the expected increase in false-alarm rate comprises comparing the distribution of the at least one phrase in documents owned by the user that suggests the phrase or by users that are authorized senders according to the accompanying security policy of the at least phrase, with the distribution of the phrase candidate within the documents of users that are not authorized senders according to the accompanying security policy of the at least one phrase.

In another preferred embodiment of the present invention, the required action comprises at least one of the following:

Preventing distribution of the digital item.
Preventing storage of the digital item.
Preventing usage of the digital item.
Reporting distribution of the digital item.
Reporting storage of the digital item.
Reporting usage of the digital item.
Reporting.
Alerting about distribution of the digital item.
Alerting storage of the digital item.
Alerting usage of the digital item. alerting.
Logging distribution of the digital item.
Logging storage of the digital item.
Logging usage of the digital item.
Logging.
Notifying about distribution of the digital item.
Notifying about storage of the digital item.
Notifying about usage of the digital item.
Notifying.
Notifying to an administrator.
Notifying to a manager.
Notifying to a recipient.
Notifying to a sender.
Notifying to an owner of the digital item.
Quarantine.
Alerting an administrator.
Alerting a manager.
Alerting a recipient.
Alerting a sender.
Alerting an owner of the digital item.
Reporting to an administrator.
Reporting to a manager.
Reporting to a recipient.
Reporting to a sender.
Reporting to an owner of the digital item.
Encrypting the digital item.
Changing the digital item.
Replacing an information object with the digital data item. and
Utilizing digital rights management technology on the digital item.

In another preferred embodiment of the present invention, the above usage comprises at least one of the following:

Storage.
Copying a file.
Copying an excerpt.
Editing.
Copying to clipboard.
Copying an excerpt to clipboard.
Changing format.
Changing encoding.
Renaming a file.
Encryption.
Decryption.
Changing digital management.
Opening by an application. and
Printing.

In another preferred embodiment of the present invention, the distribution policy comprises distribution regulation, for regulating at least one of the following:

Sending the digital item via mail.
Sending the digital item via web mail.
Uploading the digital item to a web server.
Uploading the digital item to a FTP server.
Sending the digital item via a file transfer application.
Sending the digital item via an instant messaging application.
Sending the digital item via a file transfer protocol. and
Sending the digital item via an instant messaging protocol.

In another preferred embodiment of the present invention, the security policy comprises at least one rule that assign authorizations based on both horizontal and vertical compartmentalization within an organization.

In another preferred embodiment of the present invention, the security policy comprises at least one rule that allows organizational entities to inherit the authorizations of their subordinates.

In another preferred embodiment of the present invention, the policy comprises placing a substantially imperceptible marking in the digital item, the marking comprising information content, and the method comprising placing the marking, when indicated by the policy, before allowing at least one of the following:

Storage of the digital item.
Usage of the digital item.
Distribution of the digital item.

In another preferred embodiment of the present invention, the method further comprising assigning a custodian to the phrase.

In another preferred embodiment of the present invention, the policy is dependent on at least one of the following:

The domain of a respective digital item.
The identity of a system.
The identity of a user.
The identity level of a user authorizing an action.
The identity of a user requesting an action.
The identity of a user involved in an action.

The identity of a user receiving an digital item.
The authentication level of a system.
The authentication level of a user.
The authentication level of a user requesting an action.
The authentication level of a user authorizing an action.
The authentication level of a user involved in an action.
The authentication level of a user receiving the digital item.
The authentication level of a user sending the digital item.
The format of an digital item instance.
An interface being used.
An application being used.
Encryption being used.
Digital rights management technology being used.
Detection of transformation, the transformation is operable to Reduce the ability to identify the transformed digital item.
Digital item integrity.
Regular usage pattern.
Regular distribution pattern.
Regular storage pattern.
Information path.
Consistency of an action with usage pattern.
The identity of a user overriding policy and authorizing the action in respect to the digital item.
The authentication level of a user overriding policy and authorizing The action in respect to the digital item.
The identity of a user sending digital item.
Information property of the digital item.
Language of the digital item.
Representation of the digital item.
Operations done on of the digital item.
Identity of users involved along the life cycle of the digital item.
Application used on of the digital item.
Transition channel of the digital item.
Participant agents.
Virtual location of a computer.
Logical location of a computer.
Physical location of a computer.
Type of a computer.
Type of a laptop computer.
Type of a desktop computer.
Type of a server computer. and
Owner identity.

In another preferred embodiment of the present invention, the digital medium comprises at least one of the following: a distribution channel. and storage medium. According to a second aspect of the present invention, a method for distributed management of document distribution over an electronic network is described. The method comprising:

Allowing each of a plurality of users to define respective key words or key phrases.
Assigning a user defining a respective keyword or key phrase as an owner of the respective keyword or key phrase.
Monitoring documents in distribution over the network for the presence of defined keywords or key phrases. and
Upon discovering a defined key word or key phrase, determining an owner thereof and notifying the owner.

In another preferred embodiment of the present invention, the step of allowing each of a plurality of users to define respective key words or key phrases comprises:

Testing a suggested key word or key phrase against the document distribution to determine a rate of false alarms that use of the suggested key word or key phrase would cause, and:
Accepting the suggested key word or key phrase only if a predetermined false alarm threshold level is not reached.

According to another aspect of the present invention, an apparatus for distributed management of phrase-based security policy applied with respect to a digital medium is described. The apparatus comprising:

A storage device for storing at least one phrase together with an accompanying security policy.
A policy reference monitor for assigning an owner to the at least one stored phrase.
A network monitoring module for scanning and analyzing the digital medium in order to locate and identify the at least one stored phrase.
A policy enforcement unit for applying and enforcing the security policy with respect to the digital item upon detection of the at least one stored phrase within a digital item in the digital medium, and
A notification and instruction's receiving module for notifying the owner about detection of the phrase owned by the owner and receiving the instruction of the owner.

In a preferred embodiment of the present invention, a default policy is assigned with respect to groups of users versus groups of keywords: i.e., a group of users may be defined to own a group of keywords or may be authorized to send keywords from the keyword group. Typically, the group of keywords would be a group of keywords that the group of users frequently uses: e.g. the legal department owns and is authorized to send keywords with a legal flavor.

The present invention successfully addresses the shortcomings of the presently known configurations by providing a method and system for efficient management of key-words filtering, which can efficiently serve current needs for network security.

BRIEF DESCRIPTION OF THE DRAWINGS

For a better understanding of the invention and to show how the same may be carried into effect, reference will be made, purely by way of example, to the accompanying drawings.

In the drawings.

DETAILED DESCRIPTION OF PREFERRED EMBODIMENTS

The present embodiments deal, generally speaking, with a method for managing keywords-based content filtering. Specifically, the current invention provides methods that allow for a distributed management of keywords and key-phrases by assigning an "owner" to at least some of the keywords and key-phrases, thereby greatly reducing the management overhead of centralized keywords-based filtering.

In the following descriptions, we use the terms "phrase" and "keyword" in the broad sense, which includes also key-phrases, designated numbers and any other pre-defined string.

Before explaining at least one embodiment of the invention in detail, it is to be understood that the invention is not limited in its application to the details of the construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

According to a first aspect of the present invention, there is provided a method for a distributed keywords management: in a preferred embodiment of the present invention, various entities within the organization are entitled to add phrases, keywords and numbers to the keyword list. By default, the one that first adds a certain keyword or a key-phrase may be defined as the owner of this keyword or key phrase. The owner is required to assign a distribution policy to each key-word or key-phrase that he owns, which preferably describes authorized senders and recipients, actions to be performed whenever unauthorized sending is detected (e.g., "quarantine", "block", "notify owner", "report" etc.). The owner is also responsible for handling distribution policy breaches and violations: e.g., in cases in which the item that contains the unauthorized key-word is sent to quarantine, as will be explained below, the owner is responsible to check the content and to decide whether to allow it to be sent to the intended recipient or not.

Note that in general, the owner has a better insight regarding the implications of the existence of key-phrases and key-words in a certain context, and therefore can provide better instructions after their detection.

Figure 1:
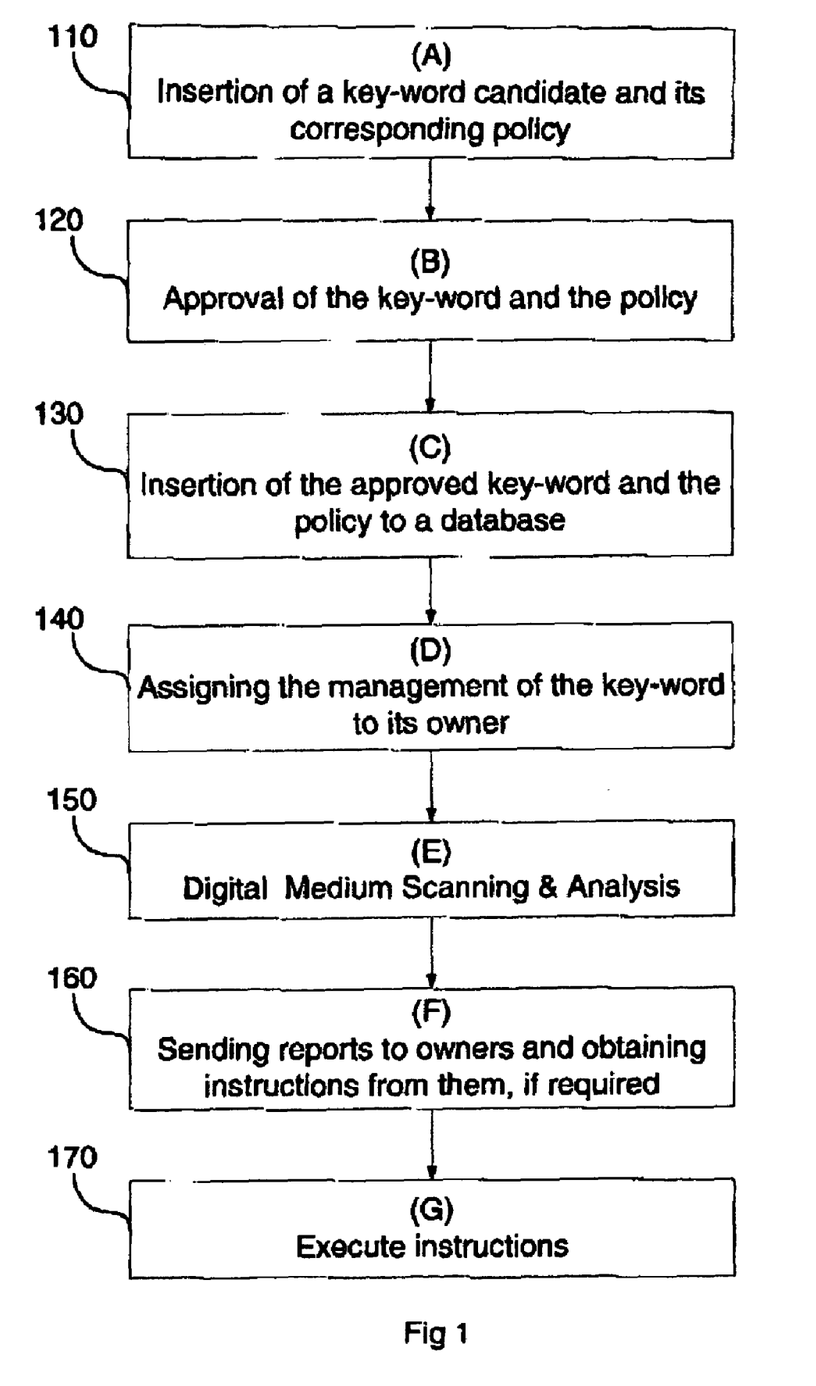
FIG. 1 is a simplified flowchart illustrating the method for distributed management of keyword filtering, operative according to a preferred embodiment of the present invention.

Reference is firstly made to FIG. 1, which is a simplified flowchart illustrating the method for owner-based management of keyword filtering, operative according to a preferred embodiment of the present invention. According to the method, users are allowed to insert key-words candidates, together with the accompanying policy to the system (stage A, indicated as 110). Each key-word candidate is thereafter subjected to an approval stage (Stage B, designated by reference numeral 120). The approved candidates are thereafter stored, together with the corresponding policy in a database (Stage C, designated by reference numeral 130). The system then notifies the users about the approval of the candidates, and the user is entitled as the owner of the keyword who is responsible for its management (Stage D designated by reference numeral 140). The system then scans and analyzes the digital traffic or other digital medium in order to locate and identify the inserted keywords and key-phrases, (Stage E, designated by reference numeral 150). Upon locating such a keyword or key-phrase, the system applies the corresponding policy and sends the owner a report. Upon receiving the report, the owner may provide instructions different then these of the default policy: e.g., to allow transmission of a certain mail message even though it contained an un-allowed key-word. (Stage F, designated by reference numeral 160). The system then executes the instruction accordingly ((Stage G, designated by reference numeral 170).

Figure 2:
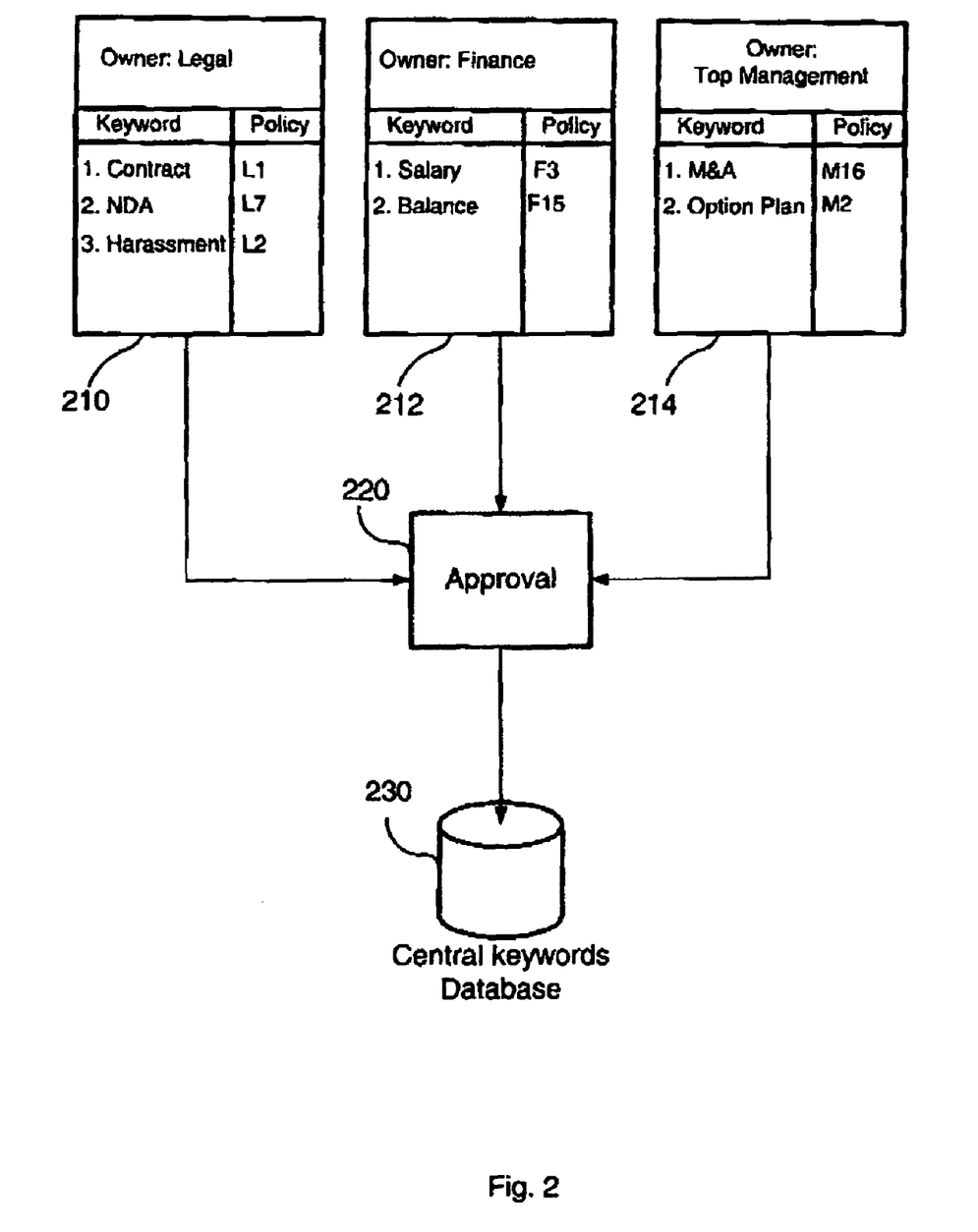
FIG. 2 illustrates the process of insertion of keywords into the system, according to a preferred embodiment of the present invention.

Reference is now made to FIG. 2, which illustrates the process of insertion of keywords into the system, according to a preferred embodiment of the present invention. Different entities within the organization, such as the legal department 210, the finance department 212 and the top management 214 submit key-word candidates, together with the corresponding policies for approval 220. The approved keywords are thereafter stored in a central database 230.

Figure 3:
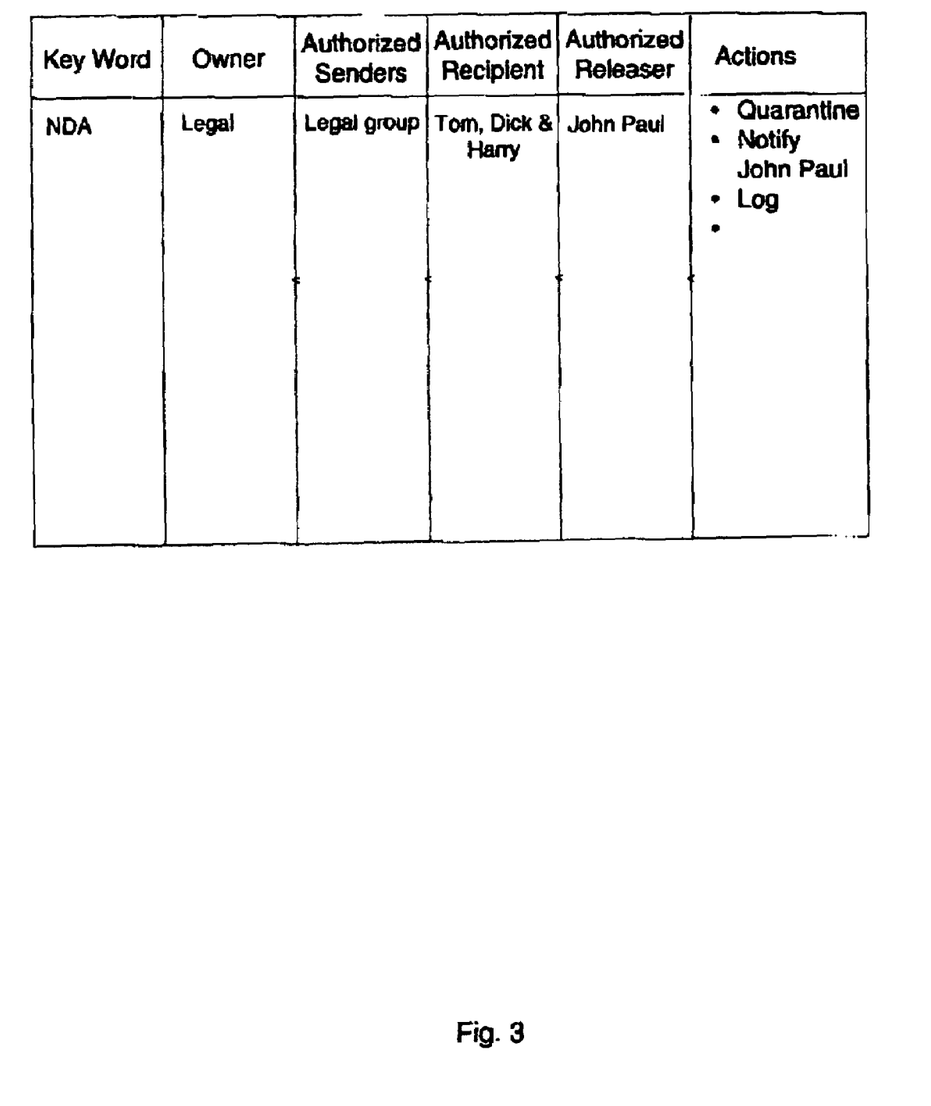
FIG. 3 is a table that describes a keyword together with some parameters of the policy that corresponds to the keyword.

FIG. 3 is a table that describes a keyword together with some parameters of the policy that corresponds to the keyword, e.g., The owner of the keyword: The owner of the keyword is authorized to assign and to change the policy, but is also responsible for the management of the keyword; the owner receives reports regarding the usage of the keywords in the messages and can release quarantined messages.

Authorized senders: the persons or entities that are entitled to use the keyword in their correspondence with the authorized recipients.

Authorized recipients: the persons or entities that are allowed to receive correspondence that includes the keyword.

Authorized releaser: in case in which a quarantine policy is used, the authorized releaser is the one that should decide whether to release the quarantined message from the quarantine and to allow it to be sent to the original recipient, or to delete the quarantined message and/or to send it back to its originator.

Actions: the set of actions that should be performed in cases where an unauthorized dissemination was detected.

In general, the policy assigned to the keywords can be a general function that maps the input parameters to one or more actions.

Figure 4:
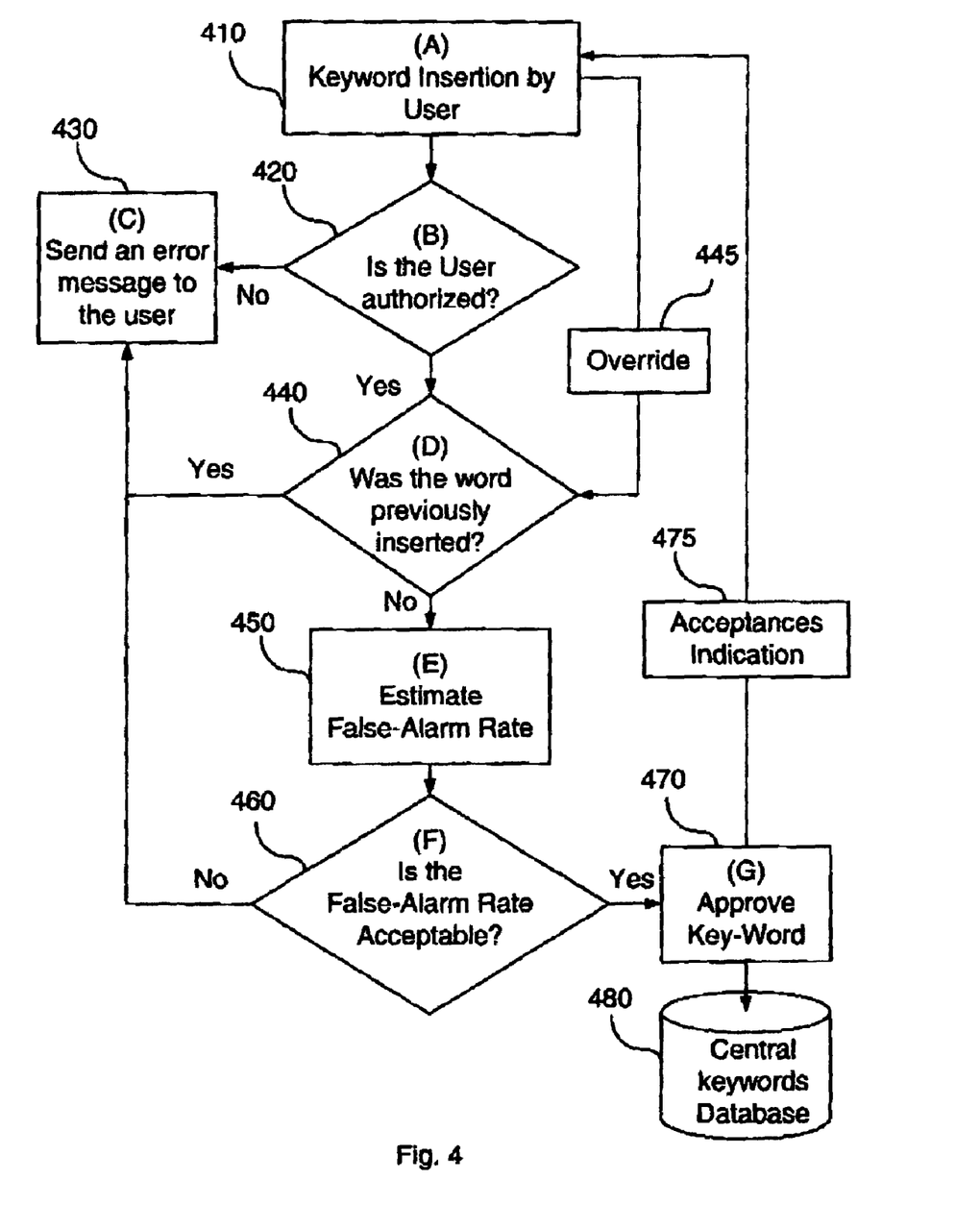
FIG. 4 illustrates a system, substantially similar to the one illustrated in FIGS. 1 and 2, which also contain a software module operable to identify digital content.

FIG. 4 is a flowchart that describes a method for approval of keyword candidates, constructive and operative according to a preferred embodiment of the present invention. The users first insert a keyword candidate to the system (stage A, designated by reference numeral 410). The system then checks if the user is authorized to insert the keyword to the system. (stage B, designated by reference numeral 420). In cases in which the user is not authorized to insert the keyword, the system sends an error message to the user (stage C, designated by reference numeral 430). If the user is authorized, the system checks if the word was previously inserted to the system. (stage D, designated by reference numeral 440). If the word was previously inserted into the system, the system again sends an error message, indicated by 430, to the user. In this case, a privileged user may override the system decision by sending an override instruction 445. Next, the system preferably estimates the false-alarm rate, (stage E, designated by reference numeral 450), either by inspecting the frequency of the keyword in the electronic traffic or by inspecting the frequency of the keyword in the various documents inside the organization, as will be explained below. If the false-alarm rate is not acceptable, an error message 420 is sent to the user (stage F, designated by reference numeral 460). If the false alarm rate is acceptable, the keyword is approved (stage G, designated by reference numeral 470), and is stored, together with its accompanied policy in the central keyword database 480. Preferably, a message contains acceptances indication 475 is sent to the user that originally inserts the keyword candidate.

In general, in order to obtain an a-priori estimate of the false alarm rate, one should discriminate between cases in which the message that contains the keyword candidate should be blocked and the cases in which the existence of the keyword candidate in the message is "innocent" and does not imply any breach or violation. Of-course, very common words need to be ruled out: i.e., words whose general usage frequencies are greater then some threshold value, such as the word "the" or "for" in English, should be ruled out. For other words, the estimation of the false-alarm ratio requires an access to a tagged database, in which the messages that contain the keyword candidate are divided into two sets: the set of the "need to be blocked" and the set of the "innocent messages". This can be obtained either by a manual tagging of the outgoing messages for a trial period or, more automatically, by searching the file-system and analyzing the distribution of the keyword candidate in the documents owned by the user or users group that suggests the keyword, and comparing it with the distribution of the keyword candidate within the documents of users that are not authorized senders. In another preferred embodiment of the present invention, the comparison is performed based on the secrecy level of the documents in a file-system: e.g., words that appear only in secret documents but not in unclassified documents are good candidates, while words that appear in unclassified documents but not in classified documents probably need to be ruled-out.

Figure 5:
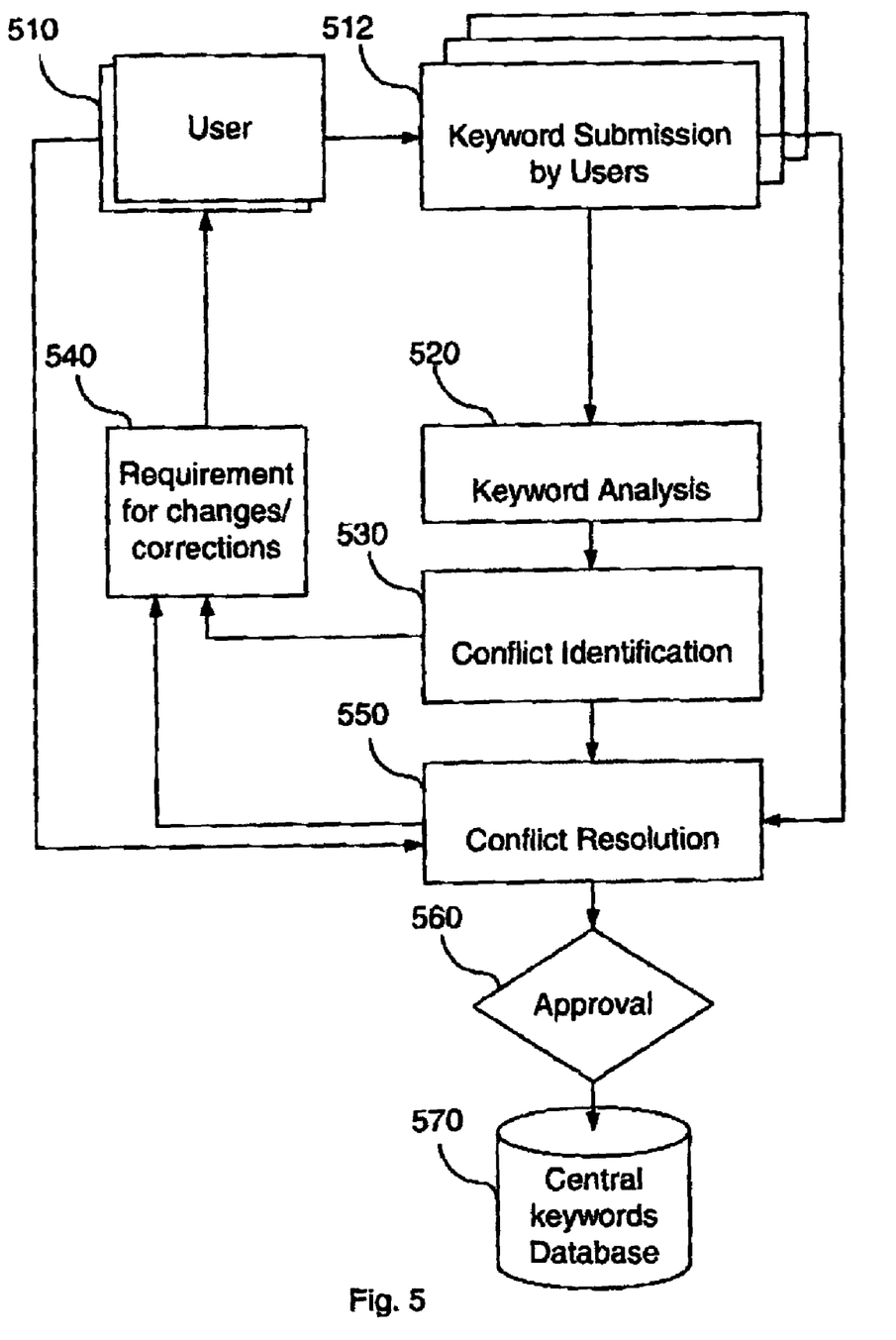
FIG. 5 is a flowchart that describes a method for approval of keyword candidates, constructive and operative according to a preferred embodiment of the present invention.

Reference is now made to FIG. 5, which illustrates an interactive method for keyword approval, constructive and operative according to a preferred embodiment of the present invention: A user 510 submit keyword candidate, 512, preferably together with an accompanying security policy. The keyword candidate and its accompanying security policy are first analyzed by the system 520 in order to identify possible conflicts with existing keywords and/or with the organization policy 530. In order to resolve such conflicts, the system may suggest the user 510 to perform changes and corrections with respect to the keywords and their corresponding policy 540. Users may submit their corrections for conflict resolution 550. The corrected keywords and their corresponding policy are then subjected for approval 560, and if they are approved, they are stored in central keyword database 570.

The security policy comprises, in general, distribution policy and/or usage policy.

Figure 6:
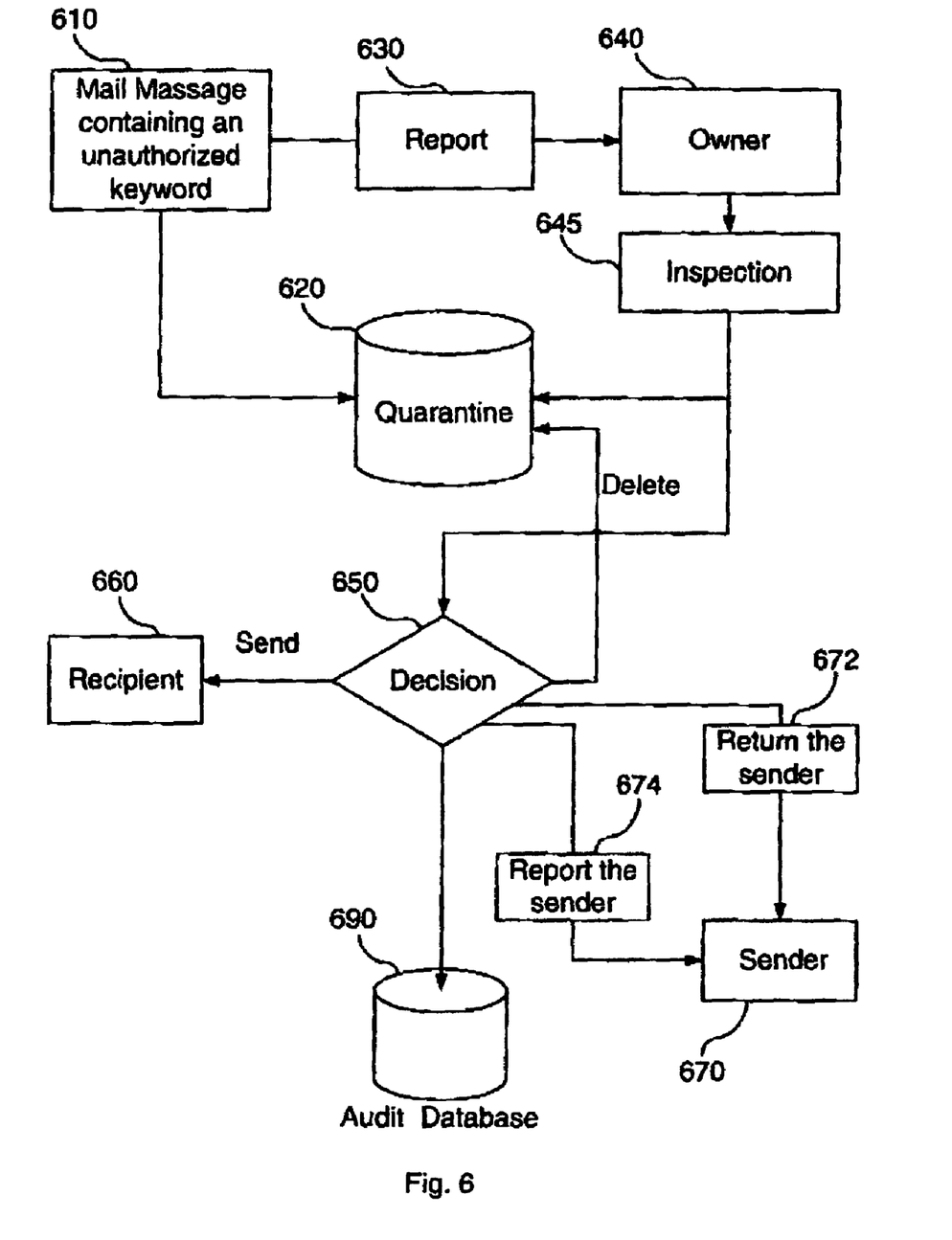
FIG. 6 is an illustration of a method for e-mail quarantine, constructive and operative according to a preferred embodiment of the present invention.

Turning now to FIG. 6, there is illustrated a method for e-mail quarantine, constructive and operative according to a preferred embodiment of the present invention. When the system detects a mail-message 610 that contains an "unauthorized" keyword, the message is sent to a special storage ("quarantine") 620 and a report 630 is sent to the owner of the keyword 640, who manually inspects the message 645. According to the result of the inspection, the owner reaches a decision 650 whether to allow the message to be sent to the recipient 660 or to return it to the sender 672. In both cases, a report 674 is preferably sent to the sender. The resulting decisions, together with the relevant parameters are preferably stored in an audit database 690.

Figure 7:
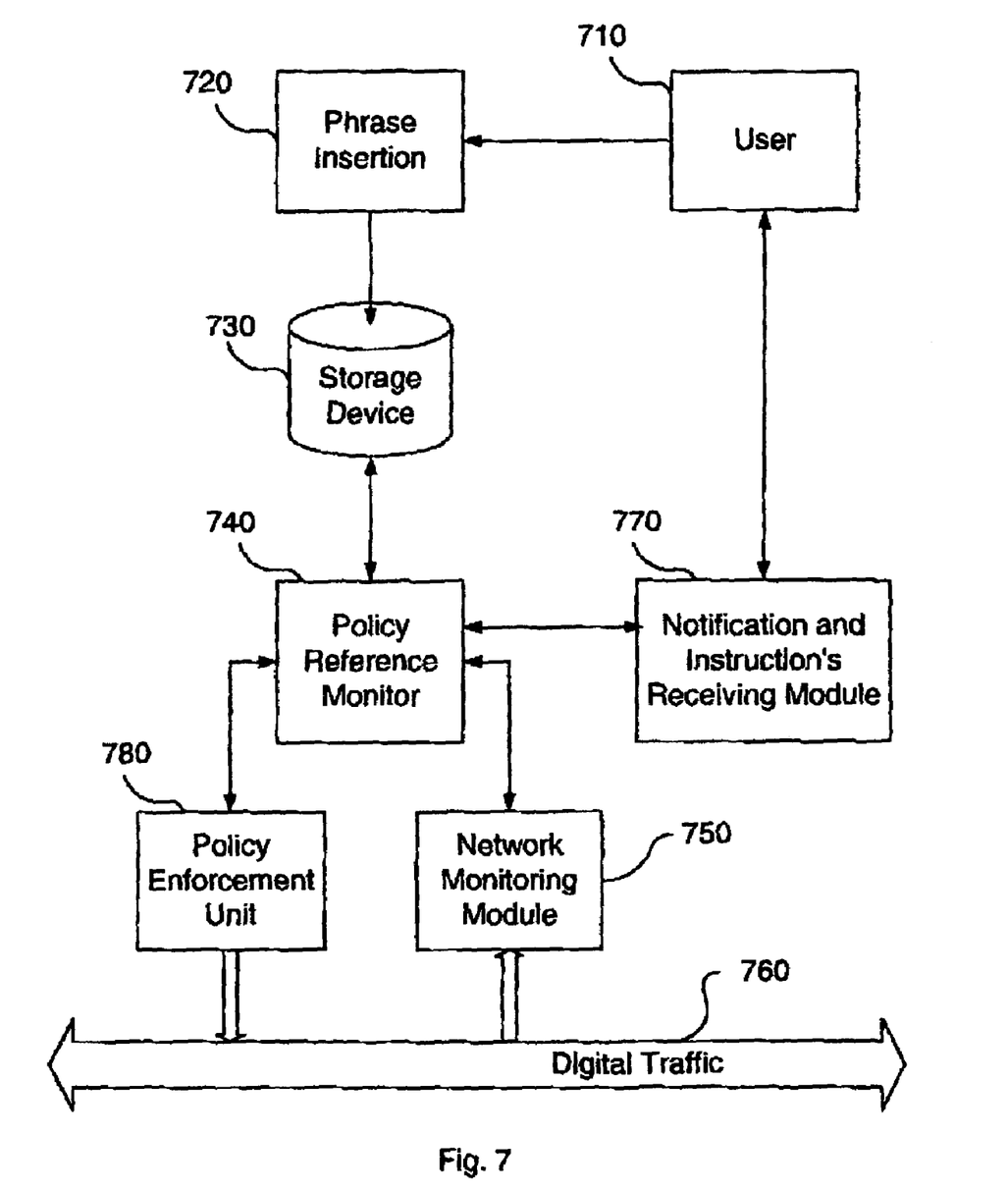
FIG. 7 is an illustration of an apparatus for distributed management of keyword filtering, constructed and operative according to a preferred embodiment of the present invention.

Reference is now made to FIG. 7, which is an illustration of an apparatus for distributed management of keyword filtering, constructed and operative according to a preferred embodiment of the present invention: the user, 710, inserts a phrase, such as a key-word, a key-phrase or a number, 720, to a storage device 730, preferably together with an accompanying policy. The policy reference monitor 740 obtains the keyword and the accompanying policy, entitle the user that inserted the phrase as the owner of the phrase and instructs the network monitoring module 750 to monitor the digital traffic 760, in order to locate and detect stored phrases. Upon detection, the policy reference monitor 740 instruct the notification and instruction's receiving module 770 to notify the owner about the detection and to obtain the owner's instructions, if exist. The policy reference monitor then instructs the policy enforcement unit to enforce the assigned policy and/or the owner instructions with respect to the digital traffic 760.

In a preferred embodiment of the present invention, a policy can be assigned also for sets of keywords and key phrases. The set-based policy is based on assigning a policy with respect either to an entire set of keywords or to any subset that contains at least m out of n keywords, where n is the size (cardinality) of the keyword set and m is some threshold value.

In a preferred embodiment of the present invention, the policy is assigned based on certain combinations of keyphrases, keywords or key-numbers: e.g., the name of person may not be allowed to appear together with his account number in the same message.

In a preferred embodiment of the present invention, the policy can assign authorizations based on both horizontal and vertical compartmentalization within the organization: e.g., only top-management people within the legal department are authorized to send a non-disclosure agreement (NDA).

In a preferred embodiment of the present invention, organizational entities inherit the authorizations of their subordinates: e.g., if a certain worker is authorized to send a mail message containing the keyword X, then, by default, her or his manager is also authorized to send a mail message containing the keyword X.

In a preferred embodiment of the present invention, the users are instructed to provide a parameter that reflects the expected negative impact of an unauthorized dissemination of a message containing a certain keyword. Based on this parameter, the system can set a default policy, e.g., if the negative impact is high, the system will block the content, and if the impact is low, the system will only notify the owner about the event.

In a preferred embodiment of the present invention, each keyword is assigned a secrecy level, and a default policy is assigned to words according to their secrecy level.

In a preferred embodiment of the present invention, a default policy is assigned to keywords that are related to a certain project based on the project secrecy level, the participants in the project, etc.

In a preferred embodiment of the present invention, a default policy is assigned with respect to the groups of users versus groups of keywords: i.e., a group of users "owned" a group of keywords or is authorized to send keywords from the keyword group. Typically, the group of keyword would be a group of keyword that the group of users frequently uses: e.g. the legal department owns and is authorized to send keywords with a legal flavor.

In a preferred embodiment of the present invention, the owner may assign a custodian to the keywords and keyphrases. In this case, the custodian takes care of the technical and administrative aspects of the management on behalf of the owner.

In a preferred embodiment of the present invention, the security or the distribution policy assigned to keyphrases or keywords comprises determining the legitimacy of at least one of the following: a set of authorized recipients; a set of authorized usages (described below); a set of allowed formats; a set of allowed channels, and a required action.

In a preferred embodiment of the present invention, the policy comprises distribution regulation, applied for the various electronic distribution channels, for regulating at least one of the following actions:

Sending the digital item via email;
Sending the digital item via web mail;
Uploading the digital item to a web server;

Uploading the digital item to a FTP server;
Sending the digital item via a file transfer application;
Sending the digital item via an instant messaging application;
Sending the digital item via a file transfer protocol; and
Sending the digital item via an instant messaging protocol.

In a preferred embodiment of the present invention, the usage defined by the security policy comprises at least one of the following:
Storage (e.g., in a local hard disk)
Copying a file or an excerpt;
Editing;
Copying to clipboard;
Copying an excerpt to clipboard;
Changing format (e.g., changing the format of a textual document to PDF);
Changing encoding (e.g., from ASCII to Unicode);
Encryption and/or decryption;
Changing digital rights management;
Opening by an application (e.g., by a word processor);
Renaming a file.
Printing.

In a preferred embodiment of the present invention the required action defined by the security policy comprises at least one of the following:
Preventing distribution of the digital item;
Preventing storage of the digital item;
Preventing usage of the digital item, such as editing, copying, printing etc.;
Reporting, such as:
  Reporting distribution of the digital item;
  Reporting storage of the digital item;
  Reporting usage of the digital item;
Alerting, such as:
  Alerting about distribution of the digital item;
  Alerting about storage of the digital item;
  Alerting about usage of the digital item;
  Alerting an administrator, such as system administrator;
  Alerting a manager, such as the manager of the group in which the breach happened;
  Alerting a recipient;
  Alerting a sender;
  Alerting an owner of the keyword, keyphrase or number;
Logging, such as:
  logging distribution of the digital item;
  logging storage of the digital item;
  logging usage of the digital item;
Notifying, such as;
  Notifying about distribution of the digital item;
  Notifying about storage of the digital item;
  Notifying about usage of the digital item;
  Notifying to an administrator;
  Notifying to a manager;
  Notifying to a recipient;
  Notifying to a sender;
  Notifying to an owner of the keyword, keyphrase or number;
Put the digital item in a quarantine, until a final decision will be taken by an authorized person.
Reporting:
  Reporting to an administrator, such as a system administrator;
  Reporting to a relevant manager;
  Reporting to a recipient;
  Reporting to a sender;
  Reporting to an owner of the keyword, keyphrase or number;
Encrypting the digital item;
Changing the digital item;
Replacing some information object within the digital data item;
Utilizing digital rights management technology on the digital item.

In a preferred embodiment of the present invention, at least some of these actions are performed utilizing methods such as these disclosed in applicant's co-pending PCT patent application PCT/IL03/00889, U.S. Patent Application No. 20020129140, U.S. application Ser. No. 10/357,201, and provisional patent application 60/437,031, the contents of each of which are hereby incorporated by reference. Furthermore, as explained in applicant's co-pending PCT patent application PCT/IL03/00889, the contents of which are hereby incorporated by reference, the policy can be dependent on many parameters, such as:
The identity of a user;
The identity of a user requesting an action;
The identity of a user involved in an action;
The identity of a user receiving a digital item;
The authentication level of a system;
The authentication level of a user;
The authentication level of a user requesting an action;
The authentication level of a user authorizing an action;
The authentication level of a user involved in an action;
The authentication level of a user receiving the digital item;
The authentication level of a user sending the digital item;
The format of an digital item instance;
An interface being used;
An application being used;
Encryption being used;
Digital rights management technology being used;
Detection of transformation, wherein the transformation is operable to reduce the ability to identify the transformed digital item;
The digital item integrity;
Regular usage pattern;
Regular distribution pattern;
Regular storage pattern;
Information path;
Consistency of an action with usage pattern;
The identity of a user overriding policy and authorizing the action in respect to the digital item;
The authentication level of a user overriding policy and authorizing the action in respect to the digital item;
The identity of a user sending digital item;
Information property of the digital item;
Language of the digital item;
Representation of the digital item;
Operations done on of the digital item;
Identity of users involved along the life cycle of the digital item;
Application used on of the digital item;
Transition channel of the digital item;
Participant agents;
Virtual location of a computer;
Logical location of a computer;
Physical location of a computer;
The domain of a respective digital item;
The identity of a system;
Type of a computer;
Type of a laptop computer;
Type of a desktop computer;
Type of a server computer; and
The owner identity.

In a preferred embodiment of the present invention the policy comprises placing a substantially imperceptible marking in the digital item, comprising information content, and the method comprising placing the marking, when indicated by the policy, before allowing at least one of the following: storage of the digital item; usage of the digital item; and distribution of the digital item, as explained, e.g., in applicant's co-pending PCT patent application PCT/IL03/00889, the contents of which is hereby incorporated by reference.

The present embodiments successfully address the shortcomings of the presently known configurations by providing a method and system for efficient distributed management of key-words filtering, which can efficiently serve current needs for information security.

It is appreciated that one or more steps of any of the methods described herein may be implemented in a different order than that shown, while not departing from the spirit and scope of the invention.

While the methods and apparatus disclosed herein may or may not have been described with reference to specific hardware or software, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

A number of features have been shown in various combinations in the above embodiments. The skilled person will appreciate that the above combinations are not exhaustive, and all reasonable combinations of the above features are hereby included in the present disclosure.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

The following claims make use of the term "phrase". It is emphasized that the term "phrase" includes a defined succession of Ascii characters, whether presented as a single word or a combination of words.

The invention claimed is:

1. A method for distributed management of a phrase-based security policy, said security policy being applied with respect to outgoing digital traffic on an electronic network, the method comprising, within said electronic network:
   a. providing a storage device, and storing at least two different phrases in said storage device;
   b. assigning a respective owner each of said stored phrases, and obtaining a respective accompanying security policy for each of said stored phrases from said respective owner;
   c. providing a network monitoring module, and electronically scanning and analyzing said outgoing digital traffic using said network monitoring module in order to detect at least one stored phrase within a digital item in said outgoing digital traffic; and
   d. upon detection of said at least one stored phrase within a digital item in said digital traffic:
      i. electronically applying said respective security policy of said detected stored phrase with respect to said digital item thereby to affect distribution of said digital item, and
      ii. outputting a notification regarding the presence of said phrase in said digital item to said respective owner, and if said respective owner responds with instructions relating to distribution of said digital item, electronically applying said provided instructions with respect to distribution of said digital item;
   thereby applying said distributed management of a phrase based distribution policy over said electronic network.

2. A method according to claim 1, wherein said phrase comprises any of: keyword, keyphrase and number.

3. A method according to claim 1, wherein said security policy comprises either of a distribution policy and a usage policy.

4. A method according to claim 3, wherein said usage comprises at least one of the following: storage; copying a file; copying an excerpt; editing; copying to clipboard; copying an excerpt to clipboard; changing format; changing encoding; renaming a file; encryption; decryption; changing digital management; opening by an application; and printing.

5. A method according to claim 3, wherein said distribution policy comprises distribution regulation, said distribution regulation being for regulating at least one of the following: sending said digital item via mail; sending said digital item via web mail; uploading said digital item to a web server; uploading said digital item to a FTP server; sending said digital item via a file transfer application; sending said digital item via an instant messaging application; sending said digital item via a file transfer protocol; and sending said digital item via an instant messaging protocol.

6. A method according to claim 1, wherein said security policy comprises determining a legitimacy of at least one of the following: a set of authorized recipients; a set of authorized usages; a set of allowed formats; a set of allowed distribution channels, and a required action.

7. A method according to claim 6, wherein said required action comprises at least one of the following: preventing distribution of said digital item; preventing storage of said digital item; preventing usage of said digital item; reporting distribution of said digital item; reporting storage of said digital item; reporting usage of said digital item; reporting; alerting about distribution of said digital item; alerting storage of said digital item; alerting usage of said digital item; alerting; logging distribution of said digital item; logging storage of said digital item; logging usage of said digital item; logging; notifying about distribution of said digital item; notifying about storage of said digital item; notifying about usage of said digital item; notifying; notifying to an administrator; notifying to a manager; notifying to a recipient; notifying to a sender; notifying to an owner of said digital item; quarantine; alerting an administrator; alerting a manager; alerting a recipient; alerting a sender; alerting an owner of said digital item; reporting to an administrator; reporting to a manager; reporting to a recipient; reporting to a sender; reporting to an owner of said digital item; encrypting said digital item; changing said digital item; replacing an information object with said digital item; and utilizing digital rights management technology on said digital item.

8. A method according to claim 1, further comprising approving at least one of said phrases or its respective accompanying security policy before storing said at least one of said phrases.

9. A method according to claim 8, wherein said approving at least one phrase comprises: a. determining the expected increase in false-alarm rate due to adding said at least one phrase or its respective accompanying security policy, and b. deciding whether to approve said at least one phrase based on said expected increase in said false-alarm rate.

10. A method according to claim 9, wherein said determining said expected increase in false-alarm rate comprises comparing the distribution of said at least phrase in classified documents and in un-classified documents.

11. A method according to claim 9, wherein said determining said expected increase in false-alarm rate comprises comparing the distribution of said at least one phrase in documents owned by the user that suggests said phrase or by users that are authorized senders according to said respective accompanying security policy of said at least phrase, with the distribution of said phrase candidate within the documents of users that are not authorized senders according to said respective accompanying security policy of said at least one phrase.

12. A method according to claim 1, wherein said security policy comprises rules to be applied after detecting at least one set of said stored phrases within said digital item.

13. A method according to claim 12, wherein said at least one set comprises one or more combinations of said stored phrases.

14. A method according to claim 1, wherein said security policy comprises at least one rule, said at least one rule being to determine the actions to be applied according to the number of said phrases detected within said digital item.

15. A method according to claim 1, further comprising assigning a default security policy to at least one of said stored phrases.

16. A method according to claim 15, wherein said assigning said default security policy comprises: a. allowing said owner to assign an impact parameter to said stored phrase, said impact parameter reflecting the expected negative impact of an unauthorized dissemination of a message containing said stored phrase; b. defining at least one rule, said at least one rule defines at least one action to be taken upon detecting at least one phrase to which said impact parameter was assigned, and wherein said at least one action is determined according to said impact parameter.

17. A method according to claim 15, wherein said assigning said default security policy comprises: a. allowing said owner to assign a secrecy level to said stored phrase; b. defining at least one rule, wherein said at least one rule defines at least one action to be taken upon detecting at least one phrase to which said secrecy level was assigned, and wherein said at least one action is determined according to said secrecy level.

18. A method according to claim 15, wherein said assigning said default security policy comprises: a. allowing said owner to define a project to which said stored phrase is related; b. defining at least one rule, wherein said rules defines at least one action to be taken upon detecting at least one phrase to which said project was assigned, and wherein said at least one action is determined according to said project.

19. A method according to claim 1, wherein said owner comprises a group of users.

20. A method according to claim 1, wherein said security policy comprises at least one rule that assign authorizations based on both horizontal and vertical compartmentalization within an organization.

21. A method according to claim 1, wherein said security policy comprises at least one rule that allows organizational entities to inherit the authorizations of their subordinates.

22. A method according to claim 1, wherein said policy comprises placing a substantially imperceptible marking in said digital item, said marking comprising information content, and said method comprising placing said marking, when indicated by said policy, before allowing at least one of the following: storage of said digital item; usage of said digital item; and distribution of said digital item.

23. A method according to claim 1, further comprising assigning a custodian to said phrase.

24. A method according to claim 1, wherein said policy is dependent on at least one of the following: the domain of a respective digital item; the identity of a system; the identity of a user; the identity level of a user authorizing an action; the identity of a user requesting an action; the identity of a user involved in an action; the identity of a user receiving an digital item; the authentication level of a system; the authentication level of a user; the authentication level of a user requesting an action; the authentication level of a user authorizing an action; the authentication level of a user involved in an action; the authentication level of a user receiving said digital item; the authentication level of a user sending said digital item; the format of an digital item instance; an interface being used; an application being used; encryption being used; digital rights management technology being used; detection of transformation, wherein said transformation is operable to reduce the ability to identify said transformed digital item; digital item integrity; regular usage pattern; regular distribution pattern; regular storage pattern; information path; consistency of an action with usage pattern; the identity of a user overriding policy and authorizing the action in respect to said digital item; the authentication level of a user overriding policy and authorizing the action in respect to said digital item; the identity of a user sending digital item; information property of said digital item; language of said digital item; representation of said digital item; operations done on of said digital item; identity of users involved along the life cycle of said digital item; application used on of said digital item; transition channel of said digital item; participant agents; virtual location of a computer; logical location of a computer; physical location of a computer; type of a computer; type of a laptop computer; type of a desktop computer; type of a server computer; and owner identity.

25. A method according to claim 1, wherein said digital medium comprises at least one of the following: a distribution channel; and a storage medium.

26. A method for distributed management of document distribution over an electronic network, the method comprising, over said electronic network:
providing a storage device and a network monitoring module;
allowing each of a plurality of users at locations distributed around said electronic network to define respective key words or key phrases, and storing said key words and key phrases in said storage device;
electronically assigning ones of said plurality of users defining a respective keyword or key phrase as an owner of said respective keyword or key phrase;
electronically monitoring electronic documents in distribution over said electronic network for the presence of said defined keywords or key phrases using said network monitoring module; and
upon discovering one of said defined key words or key phrases in an electronic document currently being distributed over said electronic network as a result of said electronic monitoring, determining an owner thereof and outputting a notification to said owner, receiving said owner's instructions for handling said electronic document containing said phrase, and applying said instructions to said electronic document containing said phrase, thereby providing said distributed management of document distribution.

27. The method of claim 26, wherein said step of allowing each of a plurality of users to define respective key words or key phrases comprises: testing a suggested key word or key phrase against said document distribution to determine a rate of false alarms that use of said suggested key word or key phrase would cause, and accepting said suggested key word or key phrase only if a predetermined false alarm threshold level is not reached.

28. An apparatus for distributed management of a phrase-based security policy on an electronic network, said security policy being applied with respect to digital documents traveling over said electronic network, the apparatus comprising:

a. a storage device configured for storing at least two phrases together with a respective accompanying security policy;

b. a policy reference monitor configured for assigning network users as owners to respective stored phrases;

c. at least one network monitoring module configured for scanning and analyzing digital documents of passing digital traffic in order to locate and identify respective stored phrases from said passing digital traffic;

d. a policy enforcement unit configured for applying and enforcing said accompanying security policy with respect to respective digital documents upon detection of respective stored phrases therewithin, and e. a notification and instruction module, associated with said policy enforcement unit, configured for notifying said owner about detection of a respective owned phrase and receiving an instruction of said owner for a response, said response to be passed to said policy enforcement unit for application to said respective digital document, thereby providing a phrase-based security policy for electronic document distribution on an electronic network.

29. An apparatus according to claim 28, wherein said phrase comprises any of: keyword, keyphrase and number.

30. An apparatus according to claim 28, wherein said security policy comprises either of a distribution policy and a usage policy.

31. An apparatus according to claim 28, wherein said security policy comprises determining a legitimacy of at least one of the following: a set of authorized recipients; a set of authorized usages; a set of allowed formats; a set of allowed distribution channels, and a required action.

32. An apparatus according to claim 28, wherein said digital medium comprises at least one of the following: a distribution channel; and a storage medium.

* * * * *